(12) United States Patent
Reza et al.

(10) Patent No.: US 7,936,697 B2
(45) Date of Patent: May 3, 2011

(54) TOPOLOGY AWARE MANET FOR MOBILE NETWORKS

(75) Inventors: Ghanadan Reza, Berkeley Heights, NJ (US); John A. Gu, Rockaway, NJ (US); Jessica Y. Hsu, Clifton, NJ (US); Gregory S. Sadosuk, Fairfax, VA (US); Phong C. Khuu, Ashburn, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 736 days.

(21) Appl. No.: 11/897,474

(22) Filed: Aug. 30, 2007

(65) Prior Publication Data
US 2009/0059816 A1    Mar. 5, 2009

(51) Int. Cl.
*G01R 31/08* (2006.01)
(52) U.S. Cl. ......... 370/252; 370/328; 370/310; 370/256

(58) Field of Classification Search .................. 370/328, 370/310, 256, 252
See application file for complete search history.

(56) References Cited

U.S. PATENT DOCUMENTS

| 7,075,890 | B2 | 7/2006 | Ozer et al. | |
| 7,184,421 | B1 | 2/2007 | Liu et al. | |
| 7,532,585 | B2 * | 5/2009 | Kim et al. | 370/254 |
| 2004/0233855 | A1 | 11/2004 | Gutierrez et al. | |
| 2007/0133483 | A1 | 6/2007 | Lee et al. | |

* cited by examiner

*Primary Examiner* — Huy D Vu
*Assistant Examiner* — Kibrom T Hailu
(74) *Attorney, Agent, or Firm* — Dilworth & Barrese; Leo G. Lenna

(57) ABSTRACT

Systems and methods provide adaptability in a mobile ad hoc network (MANET), based on an existing protocol, such as adaptive hybrid domain routing (AHDR). The systems and methods are especially suited for fast changing topologies that may change after a reactive route discovery has been completed.

7 Claims, 6 Drawing Sheets

TOPOLOGY AWARE MANET FOR MOBILE NETWORKS

FIELD OF THE INVENTION

The present invention is directed generally to improvements in wireless communication networks. More specifically, the present invention is directed to mobile ad hoc networks and related methods.

BACKGROUND OF THE INVENTION

Wireless networks have experienced increased development in the past decade. One of the most rapidly developing areas is mobile ad hoc networks (MANETs). Mobile ad hoc networks or MANETs are self configuring networks in which a number of mobile nodes may interconnect with one another via wireless links. The locations of the nodes with respect to one another, i.e., the topology of the network, may therefore change rapidly particularly when such networks are deployed in emergency situations or in military operations.

Physically, a MANET includes a number of geographically distributed, potentially mobile nodes sharing one or more common radio channels. Compared with other types of networks, such as cellular networks or satellite networks, the most distinctive feature of MANETS is the lack of any fixed infrastructure. The network is formed of mobile (and potentially stationary) nodes, and is created on the fly as the nodes communicate with each other. In this type of network, the routing nodes are allowed to move and form a dynamic autonomous network with an arbitrary topology. The network does not depend on a particular node and dynamically adjusts as some nodes join or others leave the network. A MANET is also referred to as a "multi-hop network" because multiple wireless transmission hops may be necessary to forward message packets between nodes in the network.

In a military joint airborne environment, efficient networking requires operational flexibility with ad-hoc management of networking resources. It is also important to maintain low overhead so that bandwidth remains available for communication among users. Network users may also require end-to-end quality-of-service (QoS) support to manage latency, stability, and response time. Other desirable operational requirements may include security, adaptability, interoperability, speedy join time, and rapid network formation.

MANETs are attractive because they provide instant network formation without the need for connection planning and routing node administration. The result is ease of deployment, speed of deployment, and decreased dependence on a fixed infrastructure. Despite their advantages, however, MANETs must overcome numerous obstacles to effective communications. As such, there are a number of issues with MANET that need to be addressed.

One issue is network management. An implicit assumption within a MANET is that every node within the network may wish to communicate with every other node within the network. The MANET protocol defines all nodes as routers, and then goes about trying to comprehend how each router maintains real time knowledge about the existence of other routers within the network. This becomes an exponential task to manage as the network increases in size. This problem is compounded by the ability of the nodes to dynamically enter or leave the network in an "ad hoc" fashion. The ad hoc nature of the network creates an onerous network management problem, flooding the network with status packages requiring constant updates.

Another issue is bandwidth. As nodes enter, leave, and move around the MANET, the MANET is constantly changing. Requiring each node in the MANET to be aware of changes made by the entry, departure, or movement of a node would consume a great deal of the available bandwidth.

Another issue is power. Mobile computing systems typically rely on battery power. Since battery power is limited and communicating within the network is power-intensive, having each node update itself as another node enters, leaves, or moves with the MANET may consume a large percentage of the available power.

Another issue is complexity. As the number of nodes in the MANET increases, the number of routes through the MANET increases exponentially. For even a relatively small number of nodes (100 is typically considered a sizeable MANET), the time required to update a routing table for the MANET may take longer until another node enters, leaves, or moves within the MANET. In addition, the space requirements for storing the routing table may quickly exceed the available space in the node.

Another issue is frequency usage. The mobile nodes in a network must share common radio frequencies and are therefore prone to greater interference from each neighboring node. All functions have to be distributed among the nodes. The distance between two nodes often exceeds the radio transmission range, and a transmission may have to be relayed by other nodes before reaching its destination. Consequently, a MANET network typically has a multi-hop topology, and this topology changes as the nodes move around.

Another issue is rapidly changing topologies. Analysis of existing MANET protocols show a need for enhancements in a mobile environment with rapidly changing topology.

The present invention addresses the foregoing needs.

SUMMARY OF THE INVENTION

The present invention provides systems and methods directed to providing adaptability in a mobile ad hoc network (MANET), based on an existing protocol, such as Adaptive Hybrid Domain Routing (AHDR), outlined in previously filed application Ser. No. 11/546,783, incorporated by reference herein in its entirety. The systems and methods are especially suited for fast changing topologies that may change after a reactive route discovery has been completed.

According to one embodiment, a method is provided which adaptively refreshes hop k routes and upkeeps these routes only if needed, thereby preventing dissemination of stale data and also reducing control overhead in the network.

According to another embodiment, a method is provided based on a distributed update rate optimization and domain lead and bridge node selection algorithms, optimized on the relative mobility of each node to its neighbors.

According to yet another embodiment, a method is provided based on an efficient algorithm for providing route persistence based on a reactive route discovery technique which eliminates stale route resolutions. According to this embodiment, the technique employs a timer control based on topology changes to prevent route staleness.

For a better understanding of the invention, reference is made to the following description taken in conjunction with the accompanying drawing and the appended claims.

DESCRIPTION OF THE DRAWING FIGURES

These and other objects, features and advantages of the invention will be apparent from a consideration of the following Detailed Description Of The Invention considered in conjunction with the drawing Figures, in which.

DEFINITIONS

Figure 1:
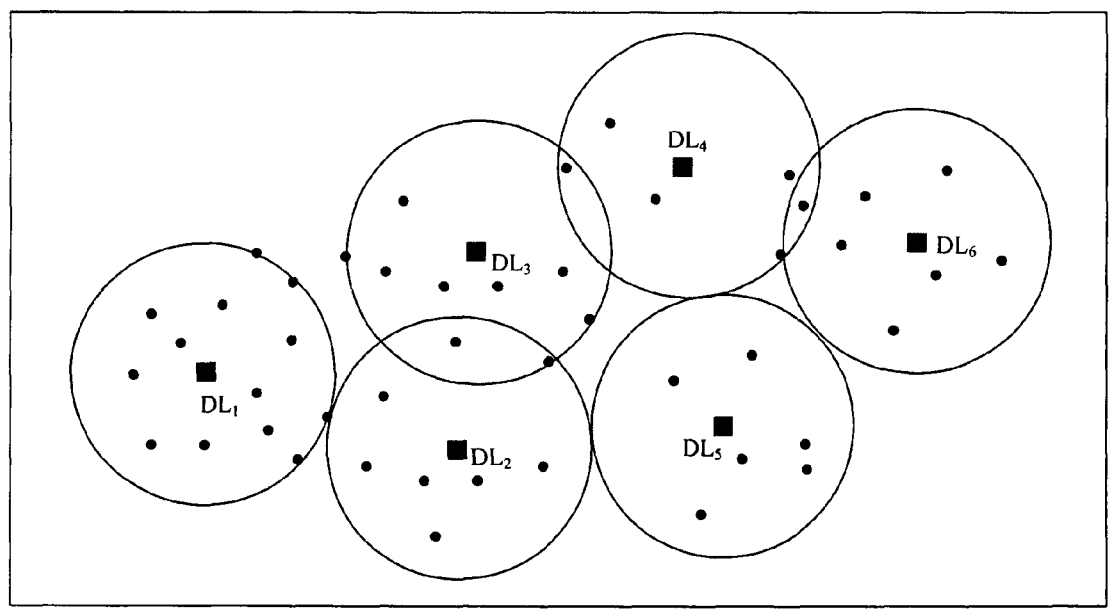
FIG. 1 is a diagram of an exemplary ad hoc network with multiple domains.
Figure 2:
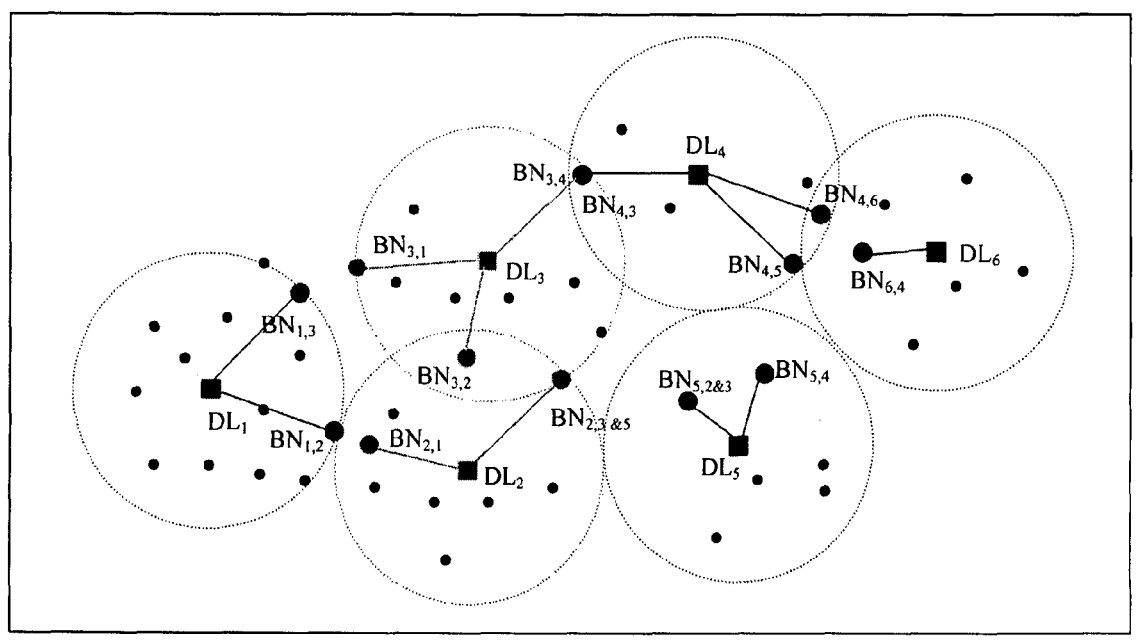
FIG. 2 is a diagram of an exemplary ad hoc network with selected domain lead and bridge nodes.

The following definitions apply to terms used herein to describe the inventive AHDR protocol.

Link State Level (LSL): A rating of, e.g., zero to 15, representing the state (e.g. quality and/or congestion) of a transmission link for a given entry in a node's H1 or H2 table. LSL may be determined from Link Quality and Link Congestion.

Domain Lead (DL) Node: A node having the most coverage of its 1 hop neighbor nodes. The DL node may send a TU1 message periodically and exchange network topology information with DL nodes of other domains less frequently in the form of topology update domain (TUd) messages. A node announces its DL status via a domain lead announcement (DLA) message to its neighbors. The former DL node renounces its DL status by broadcasting a domain lead renouncement (DLR) message to its neighbors.

Domain Node: A node that is a member of a domain with at least one DL node within 1 hop range of itself. A domain node may broadcast a TU1 message periodically, and is able to issue Route Discovery (RDisc) messages and receive Route Resolution (RRes) messages as defined below.

Domain: The region surrounding a DL node and containing all domain nodes within 1 hop distance from the DL node. That is, a DL node can reach all nodes contained within its domain via 1 hop, and vice versa.

Bridge Node: A node belonging to a set of one or more nodes that are selected by a domain node (including a DL node). A bridge node acts to bridge a domain node that selected it with nodes in other domains of the network. Bridge nodes are selected strategically to maximize a domain nodes ability to reach nodes in the other domains with minimal control overhead while providing the highest coverage of neighboring domains.

Link Node: An intermediate node which is the next hop from a node that is originating or forwarding a message along a route to another node in the network.

Hop 1 Topology Update (TU1): A message exchanged among all domain nodes containing the ID of originating node, the node's 1 hop neighbors, and the DL of the originating node's domain.

Topology Update Domain (TUd): A message exchanged among DL nodes throughout the network to disseminate information concerning nodes contained in the DL node's respective domains.

Route Discovery (RDisc): A message transmitted by a domain node wishing to obtain a route to a desired destination node.

Route Resolution (RRes): A message addressed to a domain node after a route to the desired destination node is resolved, in response to a RDisc Message from the domain node.

Network Entry: An event that occurs once a node obtains information concerning neighboring nodes, and is able to reach all other nodes in the network on demand, i.e., the entering node has identified a DL node within 1 hop.

Update Rate (Tf): Rate at which a given node sends control messages and updates routing tables.

Timer: Indicator in routing table on route persistence for a given link to neighbor nodes. The timer is decremented periodically (depending on update rate) and neighbors are removed from the routing tables when the timer runs out.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternate embodiments.

The detailed description is divided into eight sections. In the first section, a general overview is described. In the second section, a system level overview is described. In the third section, domain lead and bridge node selection is described with regard to their adaptive selection in view of a fast changing topology. In the fourth section, the link stability metric is described with regard to an adaptive calculation component. In the fifth section, adaptive update rate and route persistence is discussed in relation to adaptively calculating each value. In the sixth section, alternate route discovery is discussed in relation to its performance being adaptive to a fast changing topology. In the seventh section, adaptive routing and handoff is discussed. Finally, in the eighth section, multiple paths available for adaptive technologies is discussed.

1. General Overview

The present invention concerns a network message routing protocol for use in mobile ad hoc networks (MANETs), especially MANETs deployed in tactical environments wherein the node topology of the network may change rapidly. Referred to herein as Adaptive Hybrid Domain Routing (AHDR).

In a manner that is greatly simplified, but sufficient for understanding the invention, an ad hoc network can be thought of as a set or one or more groups of nodes with routing capability that may be fixed or mobile. At its most general, a mobile ad hoc network or MANET is described that employs (AHDR) routing protocol. The AHDR routing protocol embodies certain enhancements for highly mobile environments and fast changing topologies, such as, for example, increased network capacity and bandwidth resolution methods. These enhancements advantageously increase network capacity, reachability, and network availability, as will be described.

The AHDR protocol described herein implements a strategic hybrid combination of proactive and reactive schemes, which provides updated route information for neighbor nodes, and offers optimized route resolution for unknown routes in a fast changing topology. The AHDR network is composed of domains (which may overlap) and each domain has one designated Domain Lead (DL). The proactive component of AHDR updates routing information within each domain regularly, and DLs exchange domain information throughout the entire network. To reduce the overhead associated with the control and management of an ad hoc network, the rate of information exchange within each domain and across domains is adaptive to topological and configuration changes in addition to operational and QoS needs. The set of optimization parameters for routing decision is configurable via the network management.

The reactive component of AHDR quickly obtains route information on demand for new destinations not already available, e.g. route information for a new node entering in one part of a large network is not yet propagated to another part of the network. AHDR uses multicasting through bridge nodes to efficiently propagate updates and queries throughout the network. Each node selects a set of bridge nodes that provides maximum logical reach within one hop, and offers directional routing information from which the entire network can be reached. In the case of a large, densely populated area with frequently changing topology, AHDR offers an advantage with a priori directional information of the destination, and efficient destination resolution for unknown routes. With proactive routing within a designated range where most traffic exchange takes place, the connection establishment time can be reduced. Furthermore, reactive routing reduces the amount of control traffic by discovering the path on demand for destinations outside the immediate neighboring nodes.

2. System Level Overview

As shown diagrammatically in FIG. 1, a multicast ad hoc network 100 may be considered as comprising multiple domains, which may overlap. Each domain ($D_{1-5}$) includes one designated domain lead (i.e., $DL_{1-5}$).

Generally, in a network having a multicast proactive routing protocol, each router knows the topology of the network, so it is capable of determining the shortest (or optimum) routing path for conveying data to the source router RS.

Referring to FIG. 1, an exemplary multicast ad hoc network 100 is shown being comprised of multiple domains, which may overlap. Each domain ($D_{1-5}$) includes one designated domain lead (i.e., $DL_1$, $DL_2$, $DL_3$, $DL_4$, $DL_5$, $DL_6$). Each domain further includes some number of bridge nodes BN for linking a given domain node to nodes in corresponding neighboring domains. For example, two bridge nodes link domain lead $DL_1$ to nodes in corresponding neighboring domains (e.g., domains 2 and 3).

3. Adaptivity of Domain Lead (DL) and Bridge Node (BN) Selection

Domain Lead (DL) and Bridge Node (BN) selection accounts for neighborhood connectivity status. This is adaptive to the state of the topology and allows for smooth handoff between DL and BN transitions.

Domain Lead Adaptivity

Domain Leads (DLs) are selected mainly on the basis of Node Coverage (NC), which can be expressed in terms of a weighted function derived from the number of hop 1 nodes within range and their corresponding LSL values. See equation 1 below. Every node in the network calculates its own node coverage (NC), as well as its neighbors. When a node has the local maximum NC with stable routes, it will be designated the DL of that domain.

The node coverage (NC) of a node, e.g., node A, can be calculated according to the following formula.

$$NC(A) = s_0 * [w_0 * n + (w_1 * s_1 + w_2 * s_2 + w_3 * s_3 + \ldots + w_n * s_n)] \quad \text{Eq[1]}$$

Where
$s_0$ = state of node A
n = the total number of nodes within 1 hop around A
$w_0$ = adaptive weight put on number of nodes
$w_1 \ldots w_n$ = weights of each neighbor node depending on state and LSL $$w_n = (LSL * \min(1, \max(0, LSL - a))) + (z * \max(0, (LSL - (15-b))))$$

where
a = sets how many of the bottom LSLs get zeroed.
b = sets how many of the top LSLs get scaled up
z = weight of higher LSL
$s_1 \ldots s_n$ = state of each neighbor node
higher weight for free node than domain node and DL With default values, z=3, a=1, and b=3, we get the following weights for $w_n$:

| | Neighbor Node | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| LSL | 0 | 1 | 2 | 3 | 4 | 5 | 6 | 7 | 8 | 9 | 10 | 11 | 12 | 13 | 14 | 15 |
| Weight | 0 | 0 | 0 | 0 | 4 | 5 | 6 | 7 | 8 | 9 | 10 | 11 | 12 | 14 | 16 | 18 |

It should be noted that low mobility nodes tend to have a higher s-weight than relatively mobile nodes. Higher stability correlates to a higher s-weight, in terms of topology change, link variations, etc. Also free nodes have a higher s-weight than domain nodes.

As discussed above, to reduce the overhead associated with the control and management of the network, the rate of information exchange within each domain and across domains is adaptive to topological and configuration changes in addition to operational and QoS needs. In addition these changes, the weights W on each network node may be made adaptive with respect to various factors including, expected mobility, stability, link performance.

As illustrated in equation [1] above, the node coverage, NC, is a function of $s_0$, the state of a node, e.g., node A. The state of a node, $s_0$, is in turn dependent upon three things, free nodes, low mobility and high stability. Each factor is described as follows.

To make the state of a node $s_0$ adaptive to mobility, a link change threshold percentage, Y % is established, during system configuration. A second parameter, X, representing a threshold delta LSL increment value is also established during system configuration.

In operation, at each update increment, e.g., 2Tf, a node determines what percentage, e.g., Z %, of links have changed by more than X LSL increments, where X is a positive integer and Z is a value between 1 and 100. If the percentage Z % of link changes, in excess of X LSL increments, exceeds Y %, the pre-established threshold percentage, the state of a node $s_0$ is adjusted downward to reflect a high mobility node, which is reflected in the calculation of NC (see equation 1). $S_0$ the state of a node, incremented and decremented at a predefined levels, such that so stays within a given range, e.g. between 1 and 3.

Free nodes have a higher base s0 value, e.g. they start with s0=2 instead of 1. If 2 nodes see the exact same number of nodes with the same LSL values, but one sees a free node, the node that sees the free node would have a higher NC because the free node would have a higher s0 which contributes more to the NC. Similarly, if the node itself is a free node, it will have a higher multiplicative s0 value by which its entire NC value is scaled by. More often than not, a free node will designate itself DL to refrain from disrupting an existing stable domain.

It should be understood that for fast moving networks, the threshold percentage Y % of link changes may selected to be a larger value than for a slow moving network.

Bridge Node Adaptivity

Each node, including the DL node, selects its own set of Bridge Nodes (BNs) for TUd dissemination and inter-domain information exchange. BN selection is also adaptive to network coverage of each node, derived from the Neighbor Domain Coverage (NDC) of its H1 neighbors, with the exception of DLs within range.

Each node (including DL) will select its own set of BN for TUd dissemination and inter-domain information exchange. BN selection is also adaptive to network coverage of each node, derived from the Neighbor Domain Coverage (NDC) of its H1 neighbors, with the exception of DLs within range.

Selecting a bridge node (BN) that has the most Neighboring Domain Coverage (NDC) will allow more efficient propagation of TUd messages through domain nodes. Each node will also take into account the link stability metric of potential BNs with high NDC. In the case of high mobility, the stability metric will have higher weight in the BN selection algorithm. Please see Section (2) for Stability metric.

A node will be selected as a bridge node if it has the highest NDC for one or more neighboring DL ID.

Neighboring domain coverage (NDC) is computed from a similar weighted function that normal H1 NC is derived from. H1 data exchange must include the NDC of each neighboring domain, along with the DL of the corresponding NDC.

In the computation of NDC for a bridge node, the NDC weights are adapted in a similar manner to that described above for equation 1.

Because the NC calculation includes all 1 hop neighbors, the sum of all NDCs of a node should equal NC.

NDC for Node A:

$$\sum_{i=1}^{n} NDC_i = NC,$$

where $n$ = total number of domains.

The neighboring domain coverage (NDC) of a node A for Domain 1, may be computed as follows:

$$NDC(A,i) = s_0 * [w_0 * n + (w_1 * s_1 + w_2 * s_2 + w_3 * s_3 + \ldots + w_n * s_n)], \quad \text{Eq. [2]}$$

Similarly, where:
 $s_0$=state of node A
 n=the total number of H1 nodes that claims DLi as its DL
 $w_0$=adaptive weight put on number of nodes
 $w_1 \ldots w_n$=weights of each neighbor node depending on state and LSL $$w_n = (LSL*\min(1, \max(0, LSL-a))) + (z*\max(0, (LSL-(15-b))))$$

a=sets how many of the bottom LSLs get zeroed.
b=sets how many of the top LSLs get scaled up
z=weight of higher LSL
$s_1 \ldots s_n$=state of each neighbor node If two nodes have equal NDC to a certain domain, the node with the higher stability is selected. A higher Link Stability Indicator (LSI) metric reflects lower mobility. The next section describes LSI in more detail.

4. Link Stability Metric

While a link may exhibit stability at any instant in time, it does not guarantee that the link has been stable in the past. For example, a link that currently appears to be stable may have been extremely unstable only a short time ago in the past (e.g., 2 seconds ago). Similarly, the same link may experience periods of stability and instability over time. It is therefore desirable to derive a metric which provides some insight regarding a link's stability over time to handle scenarios in which inelastic traffic needs to be reliably transmitted over the network. For example, it is desirable to know the weighted average link quality for a given amount of time to ensure quality of service requirements.

For these situations, where consistent quality of a link becomes an issue, it is contemplated to compute a link stability metric (LSI) as a quantitative measure of a link's reliability. The LSI metric, according to one embodiment, relies on a moving weighted average of presently acquired system metrics, such as LCI and LQI, which are fundamental metrics collected in the normal course of system operation. The LSI metric is contemplated for use as a general predictor of a link's reliability in the future. While, it is acknowledged that the past is not a perfect predictor for future stability, the LSI metric provides an easily derived and dependable metric for predicting future performance without incurring substantial additional overhead.

As is well known, the two fundamental metrics for determining the strength of a link are congestion and quality. These metrics are combined into the Link Stability Indicator (LSI) metric, based on a moving weighted average of previous changes to a link, which is especially useful in measuring the reliability (i.e., stability) of a link in the presence of mobility, as will be described.

The link stability (LSI) metric for a given node provides information on the mobility of the node in relation to the rest of the network. In addition to computing LSI for particular nodes in a network, it is contemplated to compute a domain link stability metric for each domain that will help configure the adaptive update rate for that domain. Link stability as it relates to the adaptive update rate is discussed in the next section, section 5, below. Briefly, a fast moving node may want to send out more frequent periodic updates, but a fast moving node that is not receiving or transmitting should not clutter the system with overhead.

Referring now to the computation of the Link Stability Indicator (LSI) metric, the fundamental (i.e., atomic) metrics, LCI and LQI, which are quantitative measures of congestion and quality, respectively, are combined to calculate the link stability metric, i.e., the link stability indicator $LSI_{ij}$, at time t such that negative LQI trends reduce the indicator slightly faster than positive trends improve it, as will be described below.

It is appreciated that the Link Stability Indicator (LSI) metric is calculated, in a preferred embodiment, as a weighted moving average taking into account past values of LCI, LQI and LSI.

To calculate a link stability metric between two nodes, (e.g., nodes i and j), the following general equation is applicable.

A general expression for Link Stability may be generally stated as follows. It is shown to be a function of LCI, LQI and mobility:

$$LSI_{ij}(t) = (w_1 \Delta LCI_{WMA}(t), w_2 \Delta LQI_{WMA}(t), w_3 m_i, w_4 m_j) \quad \text{Eq. [3]}$$

Where:
 $\Delta LCI_{WMA}(t)$—Weighted moving average of $\Delta LCI$ $\Delta LQI_{WMA}(t)$—Weighted moving average of $\Delta LQI$ $m_i$=mobility$_i$=(#i's good links)/(# I's link changes)

As illustrated in equation (3), Link stability is a function of LCI, LQI and mobility where mobility is calculated as a ratio of good links to link changes. Link changes are computed in accordance with the following equation:

$$\text{LSL change} > N \text{ in } X[TF] \qquad \text{Eq. [4]}$$

Equation (4) states that for a given link i, at every update period or interval X, for those links in link I's routing table, a link change is said to occur whenever the change in LSL of a link is greater than N, where N is a pre-determined threshold.

Table I illustrates, by way of example, how a link's stability (e.g., link i) may be characterized in accordance with its mobility. As shown, stable links are characterized as having lower mobility.

TABLE I

|  | # changes | # good | mobility |
|---|---|---|---|
| Mobile | 8 | 10 | 4/5 |
| Moderate | 10 | 18 | 5/9 |
| Stable | 2 | 18 | 1/9 |

Referring again to equation (3), the term, $\Delta LCI_{WMA}(t)$, represents a weighted moving average of LCI over time. The weighting scheme may be different in different embodiments. In one exemplary embodiment, as illustrated below in equation (4), the weighting scheme utilizes a set of constant weights {4, 3, 2, 1} taking into account the four most recently acquired values of LCI, which are biased in favor of the more recently acquired values. It should be understood, however, that there are no restrictions the quantity or type of weight terms used. Any weighting scheme is within contemplation of the invention.

$$\Delta LCI_{WMA}(t) = \frac{\sum_{i}^{n}(n-i)\Delta LCI_i}{2n} \qquad \text{Eq. [5]}$$

Where n=number of updates stored, and i=1 is most recent t, i=2 is t−1, etc.

A similar computation is performed to derive a weighted moving average for $\Delta LQI_{WMA}(t)$ By default, the Adaptive Hybrid Domain Routing protocol, AHDR, retains the last 5 LCI and LQI values for each link, thus n=5 for $\Delta LCI/\Delta LQI$ WMA values derived from LCI/LQI.

For example:

$$\Delta LCI_{WMA}(t) = \frac{4\Delta LCI_i + 3\Delta LCI_{i-1} + 2\Delta LCI_{i-2} + \Delta LCI_{i-3}}{10} \qquad \text{Eq. [6]}$$

The link stability metric may be further enhanced to not only account for LCI, LQI and mobility but may also take into account weighted past values of LSI, as shown in equation [6]. Further, as shown in equation (6), the fourth term multiplies the $\Delta LQI$ by a factor of 1.2 in the case where the $\Delta LQI$ is getting better and by another factor of 2 in the case where the $\Delta LQI$ is getting worse. In this manner, the link stability metric is more sensitive to negative changes in $\Delta LQI$. In other words, drops in link quality are emphasized more strongly than improvements in link quality.

$$LSI'_{ij}(t) = \Delta LQI_{WMA} + \Delta LCI_{WMA} + \alpha LSI_{ij}(t-1) + \begin{cases} \Delta LQI_t > 0 & \beta_1(\Delta LQI_t) \\ \Delta LQI_t \leq 0 & \beta_2(\Delta LQI_t) \end{cases} \qquad \text{Eq. [7]}$$

It is noted that equation (6) does not accounting for mobility. The mobility factor is accounted for in equation (7), below $$LSI_{ij}(t) = (1-m_i)(1-m_j)LSI'_{ij}(t), m \leq 1 \qquad \text{Eq. [8]}$$

If the node is extremely mobile and there are more link changes than good links, then (1−m) may be negative, thus has a floor value of zero. This equation takes into account both the mobility of node i and j, and scales LSI' accordingly to capture respective node mobility.

Providing a link stability metric serves to enhance route and next hop selection by not choosing routes and next hops that contain a link with a "small" link breakage timer. The ability to identify and use stable routes minimizes the disruption caused by mobility.

In addition, the link breakage timer can be used to influence the TU1, and TUd update frequency. This way the fixed TUx timer based updated can be dynamically adapted and frequent updates may not be necessary saving routing control overhead because routes are established based on link stability.

5. Adaptive Update Rate and Route Persistence

AHDR adapts to the state of the network by continuously tuning the update rate of each node based on relative mobility measured by routing table changes over time. Distributed update rate optimization measures relative mobility of each node to its neighbors and determines the optimal update rate for each node. Adaptive timer control for route persistence and adaptive update rates accommodate fast changing topologies. Since the adaptive measures are derived from routing table changes over a given period of time, a single fast mover will not impact the update rates of the rest of the network.

A full update is sent every N updates. For those updates performed in between, the update only includes changes in the routing tables that exceed a certain pre-defined threshold. This results in a savings in overhead by updating only those links that have experienced a notable change (i.e., exceeding the threshold). The threshold may be determined by QoS requirements.

In a fast changing topology, the route persistence of a given link existing between two nodes that is quickly degrading should not be the same as the route persistence of a stable high quality link. Adaptive timers are applied to links that are very low quality (e.g. LSL <3) or links that change more than a certain threshold in a given amount time. If the link is weak or the threshold is surpassed, then the timer of the link is reduced to a lower number. This prevents weak links from remaining in the routing tables after they are no longer available, but at the same time, keeps more stable links around if an update was lost due to interference or collisions.

Figure 3:
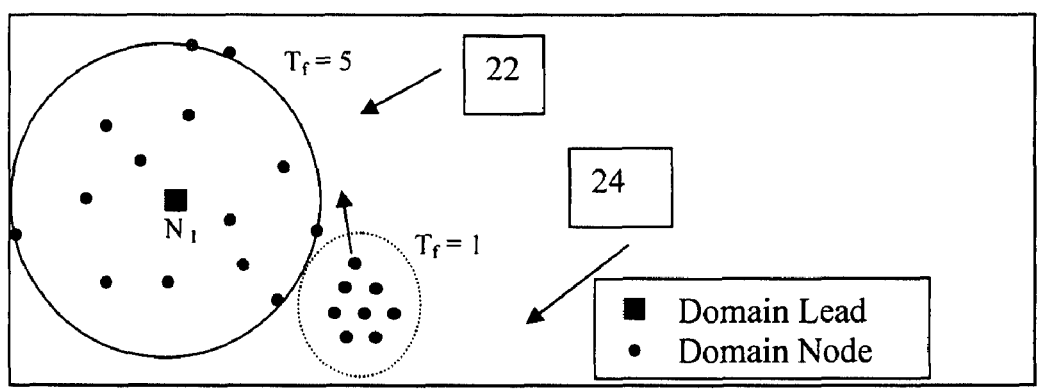
FIG. 3 is a diagram of an exemplary network including a fast moving cluster and a slow moving cluster.

Referring now to FIG. 3, a group of nodes in a fast moving cluster 24 are moving at a much higher velocity than the other slower moving or stationary nodes and consequently experience a higher number of route changes in their respective routing tables. This fast moving cluster 24 of nodes will send updates at a faster rate, to prevent stale information from the rest of the network. As other slower moving cluster 22 of nodes receive the updates from the fast moving cluster 24 of nodes, the other slower moving nodes update their timer and routing tables at the rate at which each node designates in their routing update messages. Each node will include its update rate in its TU1 messages, so every other node can know when to expect TU1 messages from every other node. It should be understood that TU1 messages comprise both full TU1 messages and delta TU1 messages.

6. Alternate Route Discovery (Adaptive to Fast Changing Topology)

Figure 4:
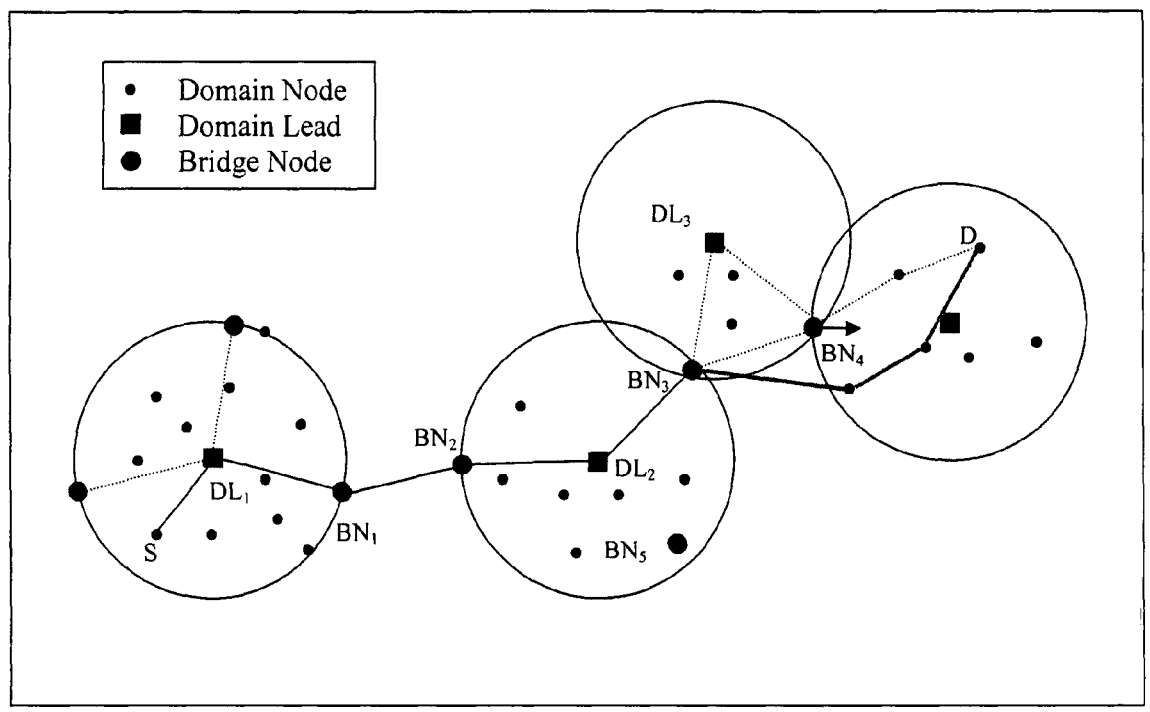
FIG. 4 is a diagram of an ad hoc network illustrating adaptive route discovery in a fast moving topology.

Referring now to FIG. 4, there is shown a diagram of an ad hoc network illustrating adaptive route discovery in a fast moving topology. AHDR issues a Route Discovery (RDisc) message from node S to node D, and a route was created between the two nodes and an entry is created in the routing table for this link. After the original data flow has completed, another application from S requests another session with D. But since then, bridge node BN4 has moved out of 2 hop range of bridge node BN3. In accordance with invention principles, and Alternate Route Discovery (ARdisc) from S to D will not generate ARRes until D has been located in the hop2 table.

A Route Discovery (RDisc) approach that does not accommodate fast changing topologies is described in co-pending U.S. patent application Ser. No. 11/546,783, incorporated by reference in its entirety herein. The method is briefly described herein as follows.

When a source node wants to send a message to a known destination node, it first searches its routing tables for the desired node. If the destination node is beyond 2 hops and no route can be determined from the current table entries, then the source node relies on the reactive component of AHDR in which the domain lead and the bridge nodes have a role. Specifically, the source node generates a Route Discovery (RDisc) message and sends it to the DL node. The source node then waits for a Route Resolution (RRes) reply message from the DL node. When the DL node receives the RDisc message, it acts as follows. If the DL node can locate the destination node within its own routing tables (H1, H2, or Hk), it generates a RRes message for the source node. The RRes message specifies, inter alia, a target node with which the source node can link in order to reach the destination node. If the DL node cannot locate the destination node in its own routing tables, it forwards the RDisc message to the DL node☐s selected bridge nodes. When the bridge nodes receive the RDisc message from the DL node, they act as follows. If a BN can locate the destination node within its own routing tables, it generates a RRes message and transmits it to the LastID (i.e., the DL node that forwarded the RDisc message). The bridge node also forwards the RDisc message to the destination node. If the BN cannot locate the destination node within its routing tables, it forwards the RDisc message to all domain lead nodes within 2 hops, unless such a DL node was the LastID of the received message, or is already listed in the RDisc message.

The method described above may be modified in accordance with the presently described embodiment to account for fast changing topologies, to be described as follows.

A source node generates an Alternate Route Discovery (ARDisc) message in the same manner as the (RDisc) message is sent, as described above. Previously, if the DL node can locate the destination node within its own routing tables (H1, H2, or Hk), it generated a RRes message for the source node. Instead of sending an RRes message, as described above, an ARRes message is generated to be sent to the source node. A key difference between the ARRes message and the Rres message is that the ARRes message will not be sent until the destination node is actually located in the H2 table. In this way, it is guaranteed that the destination node is seen within 2 hops before a reply is generated. As a result of not sending the ARRes message until the destination node is actually located in the H2 table, an non-updated (i.e., stale) Hk entry is prevented from triggering a Rres message and stale route resolutions are eliminated. Both of these consequences are effective in dynamic networks. In essence, no trust is placed in neighboring information, located in a node's Hk table, when generating route resolution messages.

7. Adaptive Routing and Handoff

AHDR implements a method of signaling lower layers of link changes in a mobile environment. In the time it takes for a packet to enter the queue and for the packet to be transmitted, the topology may have changed. Similarly, in a rapidly changing topology, links may fade in and out with mobility.

In one embodiment, a method is provided to handle the triggering between AHDR and other layers to signal link changes and adaptive handoff of a flow.

Every node in the network is responsible for distributing its own local information, and each node has the most knowledge of the fast changing topology directly around it. AHDR routes on a per hop basis, giving each node the ability to make the next hop decision depending on the link performance of the route. Multiple routes are stored in the routing tables for each destination node, so the next hop routing decision is made at each hop. As a result, if a link state becomes congested, the current link node can reroute a packet stream through an alternative next hoop neighbor node without the overhead associated with informing the source node of such route changes.

Figure 5:
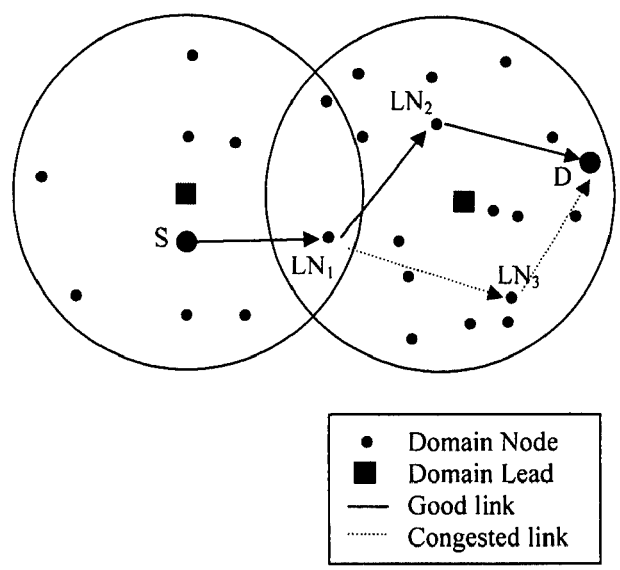
FIG. 5 is a diagram of an ad hoc network illustrating adaptive handoff in a changing topology.

Referring now to FIG. 5, there is shown an ad hoc network illustrating adaptive handoff in a changing topology. An original path between nodes S and D was through LN1 and LN3. However, as the link quality between LN1 and LN3 may become diminished due to any number of factors, including, for example, rapid congestion, fading, interference, topology changes or combinations thereof. LN1 link observer tracks the route state and redirects packets to LN2 in real time. Source node S continues to send packets to LN1 and is not concerned with the routing decisions beyond the next hop, while from the perspective of node D, the message stream is uninterrupted.

As continuous dataflow persists between 2 nodes, the sender is constantly evaluating the LSL of the link. When the LSL drops below a certain threshold designated by QoS, then the node will automatically select a better next hop neighbor for the flow.

8. Multiple Paths Available for Adaptive Topologies

AHDR collects multiple paths between source and destination, thus providing QoS routing support for various QoS routing requirements. These multiple paths enable collection of various QoS metrics, which determine the types of QoS that the network can support. Different paths will be selected for traffic of different QoS transport requirements. For example, a path selection algorithm for traffic with end-to-end transport delay requirements needs to take into account the path delay metric in addition to other path metrics while the algorithm for bandwidth sensitive traffic does not.

In one embodiment, AHDR is integrated with a QoS routing solution that implements a path selection algorithm.

As discussed in co-pending application Ser. No. 11/546, 783, the Link State Level (LSL) for a one hop (H1) neighbor node may be measured and assigned by the network's MAC layer when the local node receives a TU1 message from the H1 node. The LSL may be defined by two factors; namely, a Link Quality Indicator (LQI) and a Link Congestion Indicator (LCI). Each factor may have, e.g., four levels; the higher the level, the better the transmission condition.

LQI may be calculated from, e.g., bit error rate, packet error rate, erasures count, acknowledged frames, and CRC error count. LCI may be calculated from, e.g., bits-per-second, packets-per-second, bit count, and packet count.

The overall LSL may then be represented at, for example, 16 levels as shown in the table:

| |—| | L4 (3) | L3 (2) | L2 (1) | L1 (0) |
|---|---|---|---|---|
| L4 (3) | 15 | 13 | 10 | 6 |
| L3 (2) | 14 | 11 | 7 | 3 |
| L2 (1) | 12 | 8 | 4 | 1 |
| L1 (0) | 9 | 5 | 2 | 0 |

Figure 6:
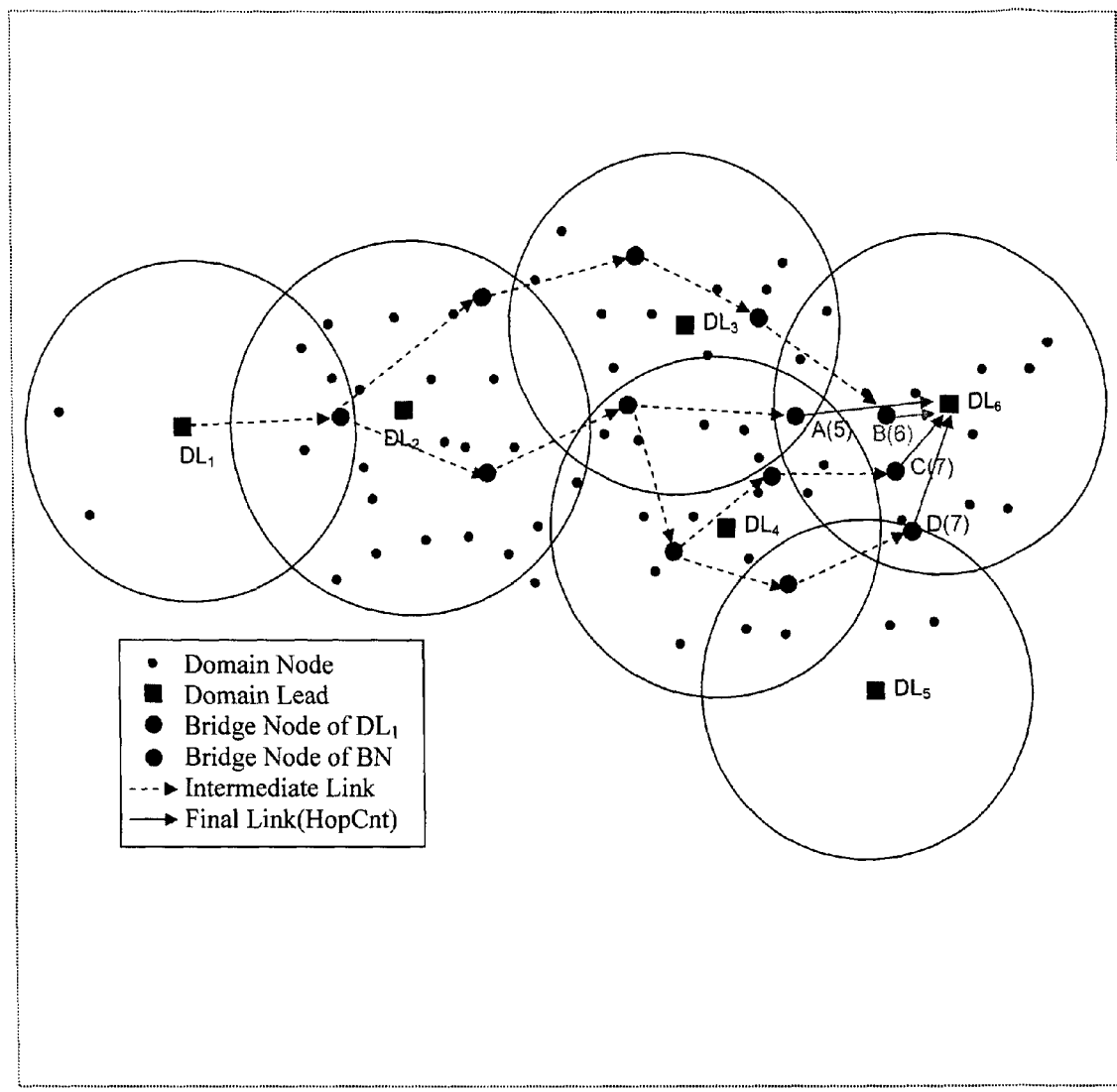
FIG. 6 is a diagram of an ad hoc network illustrating a collection of multiple paths and link performance metric in a mobile ad hoc network.

Referring now to FIG. 6, when a Tud is sent between DL1 and DL6, LP, the total link performance is collected via every path. As previously described in copending application Ser. No. 11/546,783, LP is the total link performance of the route to the hop 2 node, taken from the lower of the $LSL_{1k}$ and $LSL_{2k}$ values.

$$LP=(LSL_{hop1}+LSL_{hop2}),MIN(LSL_{hop1}+LSL_{hop2})$$

AHDR provides QoS information to determine the appropriate path for a given application or packet for transmission. As the topology changes, AHDR adaptively provides updated LP for the paths. AHDR provides the following Link Performance metric that allows adaptive path selection for various QoS requirements.

In one embodiment, one exemplary Link Performance metric, the LCI and LQI count are both one byte values, each split into four (4) levels.

LCI/LQI values of [0,1], [2,3], [4,5], [6,7]

The LCI and LQI count parameter lengths are configurable depending on network characteristics. For example, in one embodiment, each of the count parameter lengths may be 2 bytes each.

The LCI and LQI are calculated at each hop, and depending on each value, the corresponding LP bit fields are incremented. In the example below, LCI and LQI metrics are 2 bit values, mapped to corresponding Link Performance counter bits. LP counter bits are 2 bit fields for each LCI/LQI value level, and the LP counter bits are incremented at each hop depending on LCI/LQI of that link.

| Level | LP counter bits |
|---|---|
| | LCI value |
| 1 | [0, 1] | [0, 1] |
| 2 | [2, 3] | [2, 3] |
| 3 | [4, 5] | [4, 5] |
| 4 | [6, 7] | [6, 7] |
| | LQI value |
| 1 | [0, 1] | [8, 9] |
| 2 | [2, 3] | [10, 11] |
| 3 | [4, 5] | [12, 13] |
| 4 | [6, 7] | [14, 15] |

In this example, since each LP counter is only 2 bits, the counter remains at the max value for the counter of 3 after 3 hops of a certain level of LCI or LQI has been noted.

For an example 5 hop route with the following LCI/LQI values (see Table A) would result in the corresponding LP value (see Table B):

TABLE A

| Hop | LQI value | LCI value |
|---|---|---|
| 1 | 4 | 3 |
| 2 | 3 | 3 |
| 3 | 3 | 3 |
| 4 | 2 | 1 |
| 5 | 4 | 3 |

TABLE B

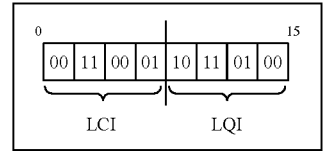

The fifth hop is the forth link with a level 3 LCI value, which is already at the max counter value, so it is kept constant.

There is a configurable limit for TUd propagation. After the number of hops exceeds the limit, the TUd is no longer propagated.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been described with reference to an example embodiment, it will be understood by those skilled in the art that a variety of modifications, additions and deletions are within the scope of the invention, as defined by the following claims.

What is claimed is:

1. A method for adaptively selecting a domain lead node from among a set of nodes in a mobile ad hoc network, the method comprising:
   (a) establishing a link change threshold percentage;
   (b) establishing a threshold delta link state level (LSL) increment value;
   (c) calculating, by each node in the network, for each node in the network what percentage of links have changed by more than the threshold delta link state level (LSL) increment value;
   (d) determining, by each node in the network, if the calculated percentage of changed links for the given node exceeds the link change percentage threshold;
   (e) adaptively computing, by each node in the network, a node coverage value (NC) for each node from among the set of nodes in the network by adaptively adjusting a state value, $s_0$, for each node, downward, in response to satisfying said determining step (d); and (f) selecting, by the set of nodes in the network, said domain lead node from among said set of nodes in said network based on a highest computed node coverage value (NC).

2. A method according to claim 1, wherein said determining step (d) is performed at successive update increments.

3. A method according to claim 1, wherein the link change threshold percentage is adjusted in accordance with a type of network.

4. A method for adaptively selecting a domain lead node from among a set of nodes in a mobile ad hoc network, the method comprising: for a given node from among said set of nodes, computing, by the given node, a node coverage (NC) value by:

(a) adaptively adjusting a plurality of weight values for neighbor nodes seen by said given node, wherein said adaptive adjustment is based upon at least one of a current state of said neighbor nodes and a current link state level (LSL) of said neighbor nodes; and (b) selecting, b set of nodes in the network, said domain lead node from among said set of nodes based on a given node having a highest computed node coverage value (NC), wherein said node coverage value for node A is adaptively computed as:

$$NC(A)=s_0*[w_0*n+(w_1*s_1+w_2*s_2+w_3*s_3+\ldots+w_n*s_n)]$$

where
$s_0$=a state of node A,
$s_1 \ldots s_n$=a state of each neighbor node,
n=a total number of nodes within 1 hop around node A,
$w_0$=an adaptive weight put on a number of nodes, and
$w_1 \ldots w_n$=weights of each neighbor node depending on the state and the LSL.

5. A method according to claim 4, wherein said weight values $w_n$ are computed as:

$$w_n=(LSL_n*\min(1,\max(0,LSL_n-a)))+(z*\max(0,(LSL_n-(15-b))))$$

where
a=sets how many of the bottom LSLs get zeroed,
b=sets how many of the top LSLs get scaled up,
n is a positive integer, and
z=weight of higher LSL.

6. A method for adaptively selecting a domain lead node from among a set of nodes in a mobile ad hoc network, the method comprising: for a given node from among said set of nodes, computing, by the given node, a node coverage (NC) value by:

(a) adaptively adjusting an adaptive weight w0 parameter in accordance with the number of neighbor nodes N seen by said given node; and (b) selecting, by the set of nodes in the network, said domain lead node from among said set of nodes based on a given node having a highest computed node coverage value (NC), wherein said node coverage value for a node A is adaptively computed as:

$$NC(A)=s_0*[w_0*n+(w_1*s_1+w_2*s_2+w_3*s_3+\ldots+w_n*s_n)]$$

where
$s_0$=a state of node A,
$s_1 \ldots s_n$=a state of each neighbor node,
n=a total number of nodes within 1 hop around node A,
$w_0$=an adaptive weight put on a number of nodes, and
$w_1 \ldots w_n$=weights of each neighbor node depending on the state and the LSL.

7. A method for adaptively selecting a domain lead node from among a set of nodes in a mobile ad hoc network, the method comprising: for a given node from among said set of nodes, computing, by the given node, a node coverage (NC) value by:

(a) adaptively adjusting a plurality of weight values for neighbor nodes seen by said given node, wherein said adaptive adjustment is based upon at least one of a current state of said neighbor nodes and a current link state level (LSL) of said neighbor nodes; and (b) selecting, by the set of nodes in the network, said domain lead node from among said set of nodes based on a given node having a highest computed node coverage value (NC), wherein said weight values $w_n$ are computed as:

$$w_n=(LSL_n*\min(1,\max(0,LSL_n-a)))+(z*\max(0,(LSL_n-(15-b))))$$

where
a=sets how many of the bottom LSLs get zeroed,
b=sets how many of the top LSLs get scaled up,
n is a positive integer, and
z=weight of higher LSL.

* * * * *